United States Patent [19]

Loodberg et al.

[11] Patent Number: 4,693,490

[45] Date of Patent: Sep. 15, 1987

[54] COLLAPSIBLE WHEEL-CHAIR

[75] Inventors: Jan A. T. Loodberg, Nyhamnsläge; Olle L. Siwersson, Helsingborg, both of Sweden

[73] Assignee: AB Scaniainventor, Helsingborg, Sweden

[21] Appl. No.: 923,149

[22] PCT Filed: Jan. 23, 1986

[86] PCT No.: PCT/SE86/00023

§ 371 Date: Oct. 15, 1986

§ 102(e) Date: Oct. 15, 1986

[87] PCT Pub. No.: WO86/04230

PCT Pub. Date: Jul. 31, 1986

[30] Foreign Application Priority Data

Jan. 24, 1985 [SE] Sweden ............................... 8500317

[51] Int. Cl.[4] ............................................. B62B 11/00

[52] U.S. Cl. ........................... 280/650; 280/242 WC; 297/DIG. 4

[58] Field of Search ........... 280/242 WC, 47.38, 47.4, 280/642, 647, 650; 297/DIG. 4

[56] References Cited

U.S. PATENT DOCUMENTS

| | | | |
|---|---|---|---|
| 762,441 | 6/1904 | Rohrer . | |
| 2,522,729 | 9/1950 | Travis . | |
| 2,592,405 | 8/1952 | Everest et al. . | |
| 3,337,261 | 8/1967 | Nihlean et al. . | |
| 4,026,568 | 5/1977 | Hallam | 280/647 |
| 4,273,350 | 6/1981 | Williams | 297/DIG. 4 |
| 4,625,984 | 12/1986 | Kitrell | 280/242 WC |

FOREIGN PATENT DOCUMENTS

| | | |
|---|---|---|
| 1176315 | 12/1964 | Fed. Rep. of Germany . |
| 161002 | 10/1957 | Sweden . |
| 711448 | 6/1954 | United Kingdom . |

*Primary Examiner*—John J. Love
*Assistant Examiner*—Donn McGiehan
*Attorney, Agent, or Firm*—Browdy and Neimark

[57] ABSTRACT

A wheel-chair has a foldable frame structure (10) which is lockable in the unfolded state and carries wheels (11, 12) and a back (13). In the folded state, all fixed parts are folded up between the wheels of the wheel-chair. The frame structure (10) is box-shaped and has foldable set and bottom members (15, 17) and foldable front and rear wall members (19, 20). These seat, bottom, front and rear wall members are pivotally connected to side wall members (14). The seat and bottom members (15, 17) consist of two parts and are folding upwards and are mechanically interconneted by means of a central wall (18) for common folding movements. The front and rear wall members (19, 20) also consist of two parts and are mechanically interconnected for common folding movements by means of a rod (22) disposed underneath the bottom portion (17). The back (13) is also made of two parts (26, 27) which are pivotally connected to the rear edge of a respective part (15) of the seat member and extend downwardly towards the bottom member (17) such that they can be locked in the unfolded state by means of a locking device (37) provided on the rigid member (22). The front and rear wall members (19, 20) are angled rearwards in all positions of the wheel-chair. The large wheels (11) of the wheel-chair have a driving ring (89) which can be moved between an inner and an outer position and which is fixed on the hub (60) of the wheel by means of leaf springs (90) and which, when the driving ring is moved between said inner and outer positions, passes an unstable position of maximum tension of the leaf springs. Also, the large wheels (11) of the wheel-chair are provided with disc brakes (80) the brake discs of which are connected to the frame structure (10) of the wheel-chair by means of a rotation-inhibiting pin member (87) and by means of a nut and screw thread (81, 83) which, when a brake handle (86) is pivoted, will move the brake disc (80) into frictional engagement with a braking surface (67) on the side face of the hub (60) of the wheel.

15 Claims, 26 Drawing Figures

COLLAPSIBLE WHEEL-CHAIR

The present invention relates to a collapsible wheel-chair which has a foldable frame structure which can be locked in the unfolded state and which supports the wheels and the back of the wheel-chair and which comprises a box-shaped seat having side wall members which are connected to foldable seat and bottom members and to foldable front and rear wall members.

Wheel-chairs of this type are known from several patent specifications, e.g. Swedish patent specification No. 161,002, German Auslegeschrift No. 1,176,315, British patent specification No. 711,448, and U.S. patent specifications Nos. 2,522,729, 2,592,405 and 3,337,261. Most of these collapsible wheel-chairs have a frame composed of a number of rods which are pivotally interconnected, such that the wheel-chair can be collapsed by the rods forming a hinge system. As a rule, the seat and back portions are made of strong woven fabrics but at least the seat portions have sometimes consisted of rigid components. Although British patent specification No. 711,448 does not relate to a collapsible wheel-chair but to a collapsible perambulator or go-cart, the system is the same as in the above-mentioned wheel-chairs.

The known wheel-chairs have several drawbacks in common. In most cases, they are quite heavy but, above all, they are rather bulky also when folded up. Often, it is also necessary to remove different parts before the chair can be collapsed, and the back portions made of fabric are often uncomfortable for the person sitting in the chair. Therefore, there is a demand for rigid panels as back portions, which has not been practicable in known constructions. In many cases, use has also been made of seats of woven fabric, this being also uncomfortable. Some of the known constructions have used rigid seats, but it has then been necessary to remove or raise these seats in a separate operation before the wheel-chair is folded up. Another drawback inherent in known collapsible wheel-chair constructions is that a load affecting the back of the chair has given rise to substantial stresses at the corners of the box-shaped structure forming the frame or body proper. Such substantial stresses have necessitated larger dimensions and, hence, have entailed a weight increase of the construction.

One demand placed on present-day collapsible wheel-chairs is that they should have a small width in the collapsed state, a contemplated overall width being 15–25 cm, including the wheels. It is a further desire that the wheel-chairs should have a smaller length in the folded state than in the unfolded state. This has not been achieved in known collapsible wheel-chair constructions.

One of the reasons why it has not been possible to achieve a small width of known wheel-chairs when collapsed is that the wheels usually have a driving ring which is mounted outside the wheel rim. This driving ring projects outside the tyre and, therefore, has contributed to an unnecessarily large width of the collapsed chair. One object of the invention therefore is to provide a movable driving ring for the two large wheels of the wheel-chair.

Another object of the invention is to provide a collapsible wheel-chair which is provided with a rigid back which should preferably also contribute to the stability of the wheel-chair when in the unfolded or raised state.

Yet another object of the invention is to provide a wheel-chair which has great stability in the unfolded state but also low weight and small size in the collapsed state.

Further objects of the invention will appear from the following description.

The above-mentioned and other objects of the invention are achieved if the collapsible wheel-chair of the type mentioned in the introduction to this specification is designed as recited in the main claim. Thus, the wheel-chair according to the invention has a foldable frame structure which can be locked in the unfolded state and which carries the wheels and the back of the wheel-chair. In the collapsed state of the chair, all fixed parts are folded up between the wheels of the wheel-chair. The frame structure is box-shaped and has foldable seat and bottom members and foldable front and rear wall members. These seat, bottom, front and rear wall members are pivotally connected to the side wall members. The seat and bottom members consist of two parts and are folding upwards and are mechanically interconnected for common folding movements. The front and rear wall members also consist of two parts and are mechanically interconnected for common folding movements by means of a rod provided underneath the bottom member. The back also consists of two rigid parts, each of which is pivotally connected to the rear edge of a respective part of the seat member and extends downwards towards the bottom member so as to be lockable in the raised state by means of a locking device provided on the rigid member. The front and rear wall members are angled rearwards in all positions of the wheel-chair. The large wheels of the wheel-chair have a driving ring which can be moved between an inner and an outer position and which is fixed on the hub of the wheel by means of leaf springs and which, when being moved between said two positions, passes an unstable position of maximum tension of the leaf springs. Further, the large wheels of the wheel-chair are provided with disc brakes the brake discs of which are connected to the frame structure of the wheel-chair by means of a rotation-inhibiting pin member and by means of a nut and screw thread which, when a brake handle for the brake disc is pivoted, moves the brake disc into frictional engagement with a braking surface on the side face of the hub of the wheel.

By designing the collapsible wheel-chair as recited in the main claim, many of the above-mentioned shortcomings of known wheel-chair constructions can be obviated. The distinctive features of the wheel-chair according to the invention do not actually reside in the folding arrangement of the different rigid components, for this is previously known from many of the above-mentioned patent specifications, but the novel features reside in how folding is achieved for the separate seat and bottom members, the front and rear wall members and the back, and in the provision of the rigid member which extends underneath the bottom member and which mechanically interconnects the front and rear wall members. The fact that this rigid member or rod interconnects the folding front and rear wall members means that the rigid member and, hence, the footrests optionally fixed thereon will be folded up between the front wheels of the wheel-chair when this is collapsed. In this way, the wheel-chair becomes compact by having a shorter length in the folded state than in the unfolded state. The rod or rigid member has a further function by supporting the lowered bottom member lying in the horizontal plane and connected to the seat by means of a connecting member which brings about the common folding movements of the bottom and seat portions. Since the back portions are each pivotally connected to the rear edge of a respective part of the folding seat member, there is obtained a very good distribution of the forces which are exerted on the back by the person sitting in the wheel-chair. In addition, the back extends downwardly below the pivotal connection with the seat member, and the downwardly extending portions of the back are pressed against the rear wall members which are thus held in place. By the releasable engagement with the locking device provided on the frame structure, the back is maintained in the raised position, which in turn means that the unfolded wheel-chair will have the required stability and is locked against unintentional folding-up.

In order to reduce the weight, it is advantageous in a wheel-chair according to the invention to connect the wheels of the wheel-chair to corner pieces which are each arranged at the corner of a respective side wall member and connected to hinge pins for the rear wall, front wall and bottom members. In this manner, the hinge pins of the frame structure will directly transmit the loads to the corner pieces and, thus, directly to the four wheels.

Optimum function of the collapsible wheel-chair is achieved if the front and rear wall members are given a length which exceeds the width of the frame structure in the unfolded state, such that the two front wall members and also the two rear wall members will be directed obliquely rearwards and make an obtuse angle with each other when the frame structure is in its unfolded state. This design of the front and rear wall members is especially advantageous in combination with the measure of letting the two downwardly extending back portions of the back abut on the rear wall so as to prevent folding thereof when the back is in its raised position. The back will then serve as a lock which prevents unintentional folding of the foldable front and rear wall portions which, as stated above, are interconnected by means of the rigid member extending underneath the bottom member.

In order to facilitate the folding of the wheel-chair and to prevent any relative movement between the two portions of the back in the raised state thereof, it is particularly advantageous in a further development of the invention if those parts of the two back portions which are located below the pivotal connection of the back portions with the rear edge of the corresponding seat member are obliquely cut in a downward direction away from each other in order, during the initial phase of an upward folding movement of the seat and bottom members, to make it possible in the plane of the back to move apart the parts of the back portions which are located above said pivotal connection, and also if the mutually facing edges of the two back portions above said pivotal connection have engagement means which in the fully raised state of the frame structure engage with each other in order to prevent any relative movement between the back portions perpendicular to the planes thereof. The engagement means may then preferably consist of complementary flanges and recesses in the mutually facing edge portions of the two back portions.

The locking device for maintaining the back in the raised state is preferably provided on a rearwardly projecting part of the rigid member disposed underneath the bottom portion. The locking device may then be fixedly mounted on the rigid member but may also be movably mounted thereon. If the locking device is fixedly mounted on the rigid member, each of the back portions preferably has a locking projection which in the fully raised state of the frame structure is in locking engagement with the locking device and prevents lowering of the back and which, when the parts of the back portions located above the seat member are moved apart in the plane of the back, is moved out of said locking engagement to permit lowering the back.

The shaft hingedly interconnecting the two seat portions of the seat member may in an advantageous embodiment of the invention be caused to extend through a central recess on the seat member, thus serving as a handle for lifting the wheel-chair when folding it up. To this end, it is most convenient to provide the back portions with à corresponding recess, such that it is possible to grip the handle once the back has been lowered.

As mentioned above, it is especially advantageous in the invention if each of the large wheels of the wheel-chair has a driving ring which can be moved between an inner and an outer position. In an especially advantageous embodiment of the invention, this driving ring is connected to the hub of the wheel by means of at least three leaf springs which are provided substantially in the plane of the wheel and which in their untensioned state have a length which exceeds the difference between the diameter of the hub and the diameter of the driving ring and which are constantly maintained tensioned in a slightly S-shaped state by means of a flexible connection between the wheel and the driving ring and which have such a length and such an S-shape that, when the driving ring is pressed inwards towards the wheel, they pass an unstable position of maximum tension and thereafter urge the driving ring against the wheel.

The invention will now be described in greater detail hereinbelow with reference to the accompanying drawings, in which.

Figure 4:
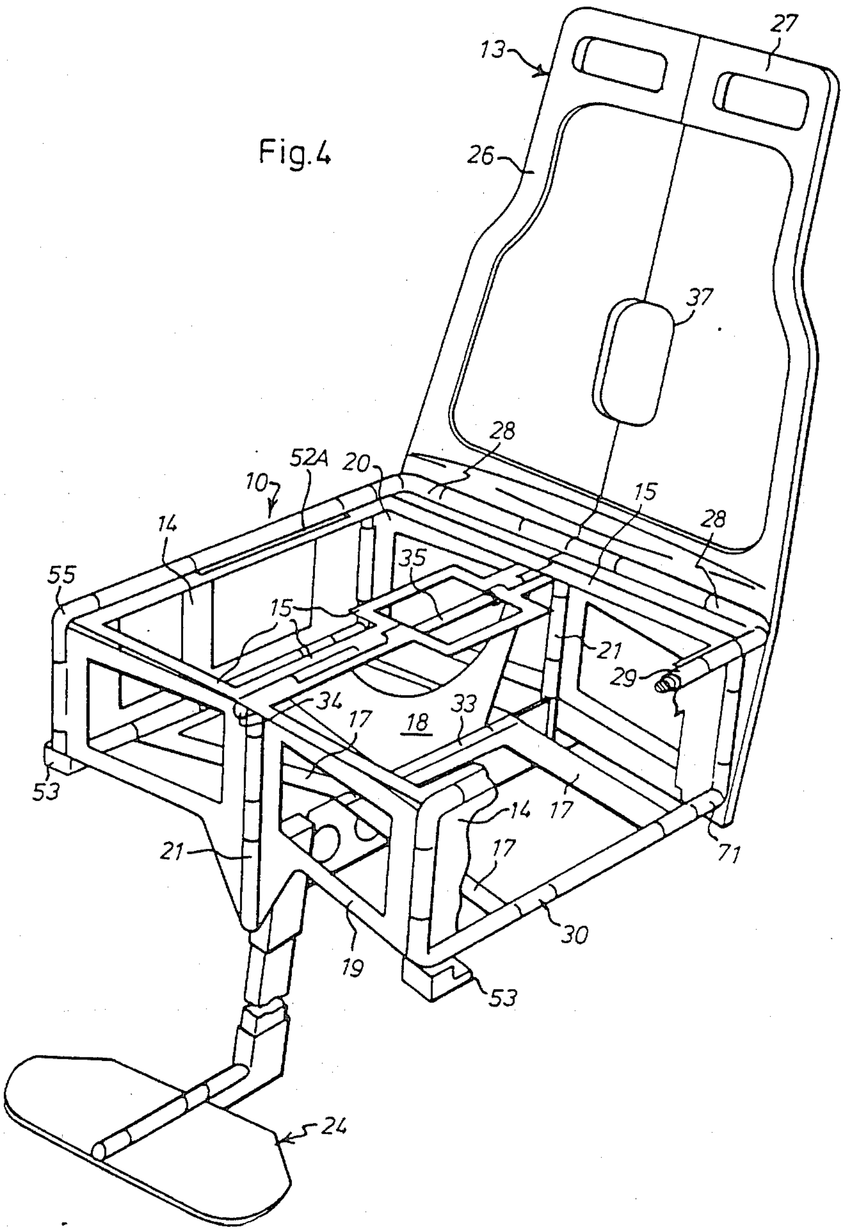
FIG. 4 is a schematic perspective view of a frame structure included in the wheel-chair.
Figure 21:
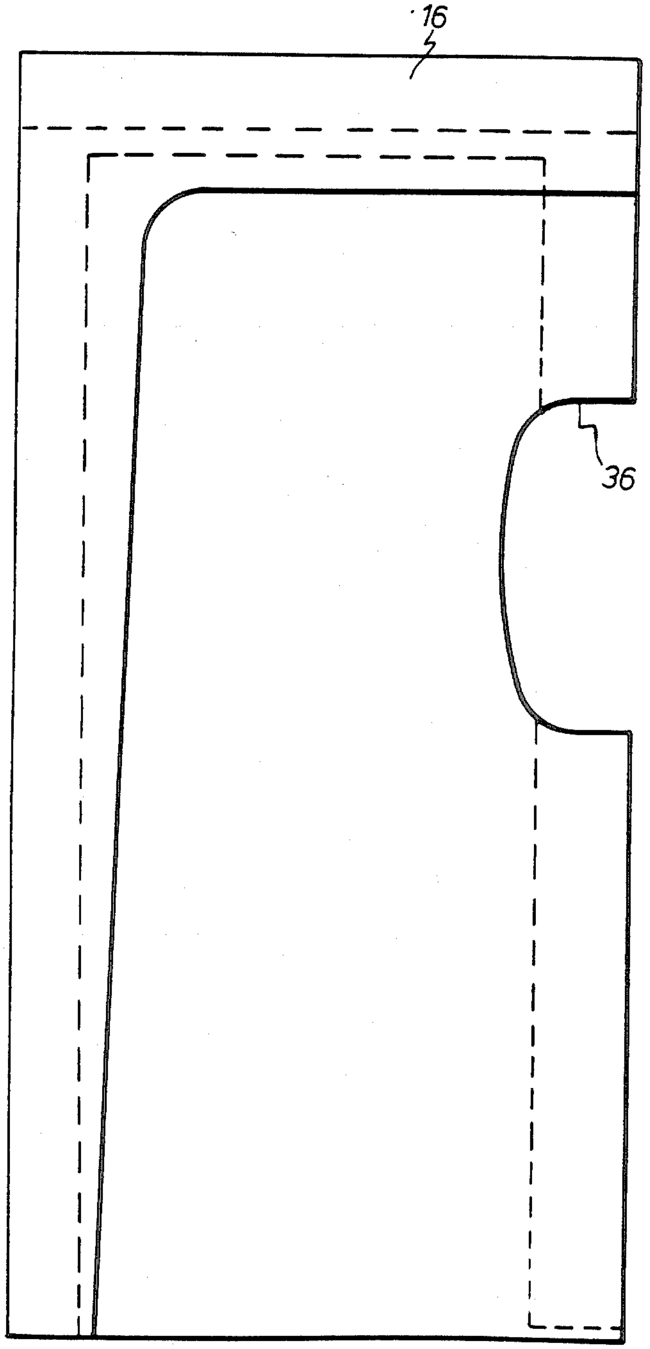
FIG. 21 shows one seat pad half for the seat in the wheel-chair according to FIG. 1.
Figure 22:
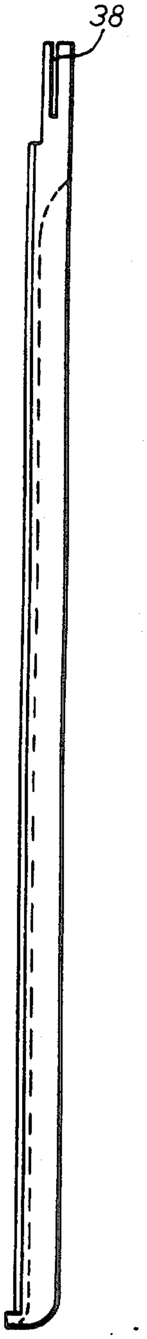
FIG. 22 is a side view of the seat pad shown in FIG. 21.
Figure 23:
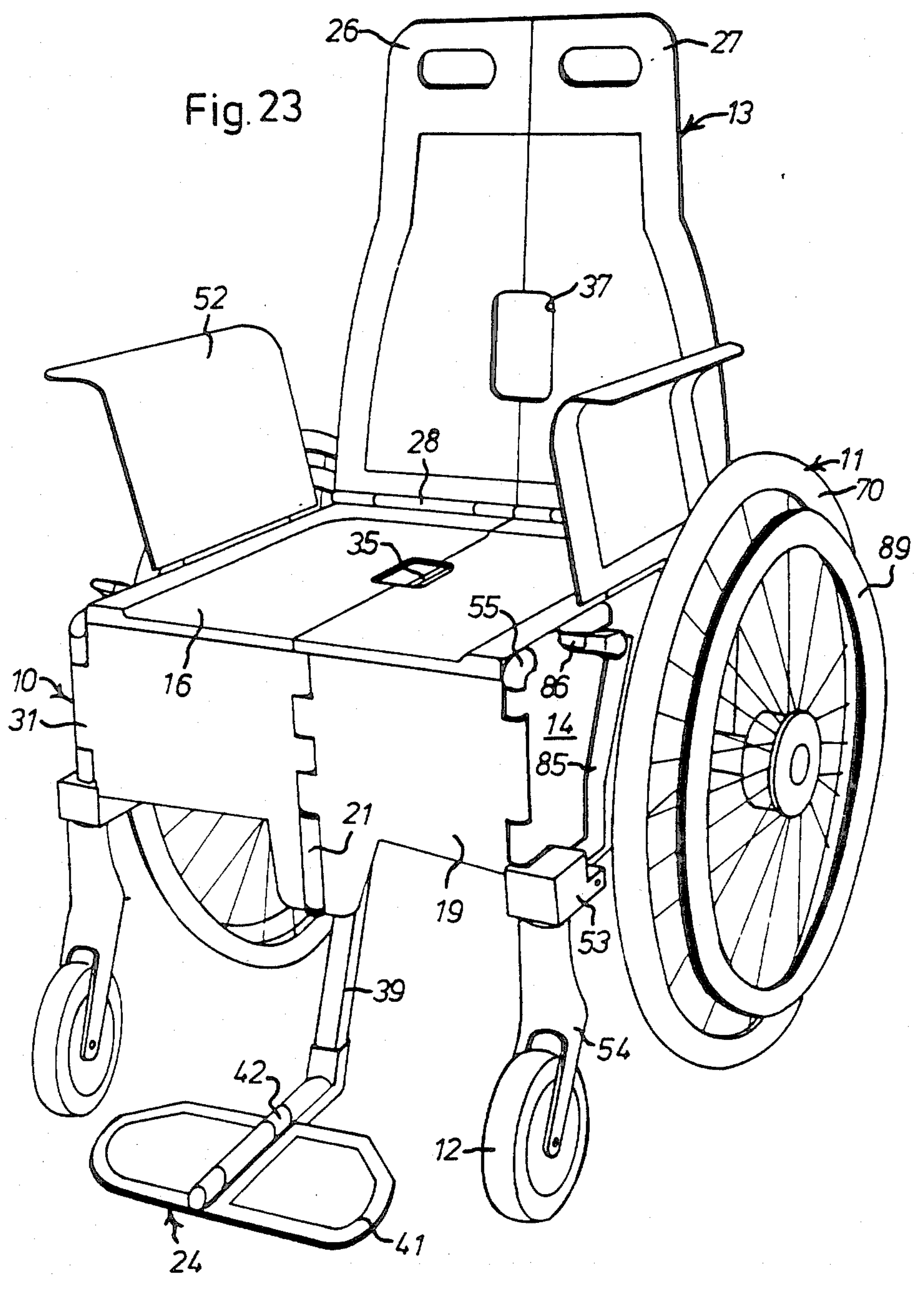
FIG. 23 is a perspective view of the wheel-chair in the unfolded state.
Figure 24:
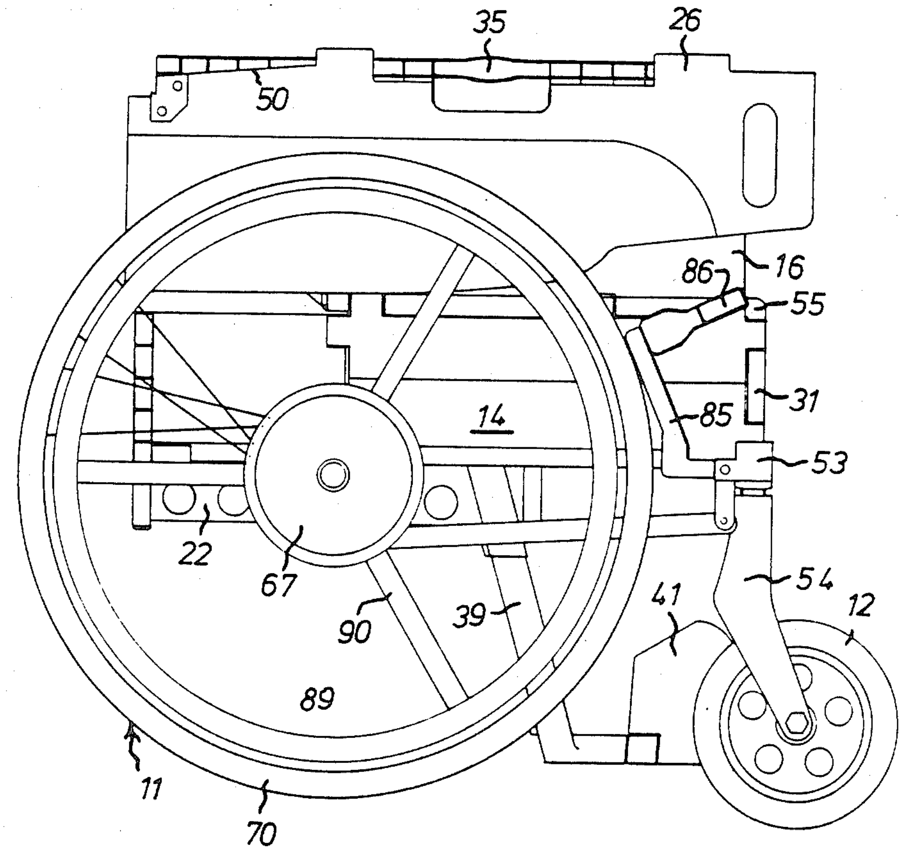
FIG. 24 shows the collapsed wheel-chair from the side.
Figure 25:
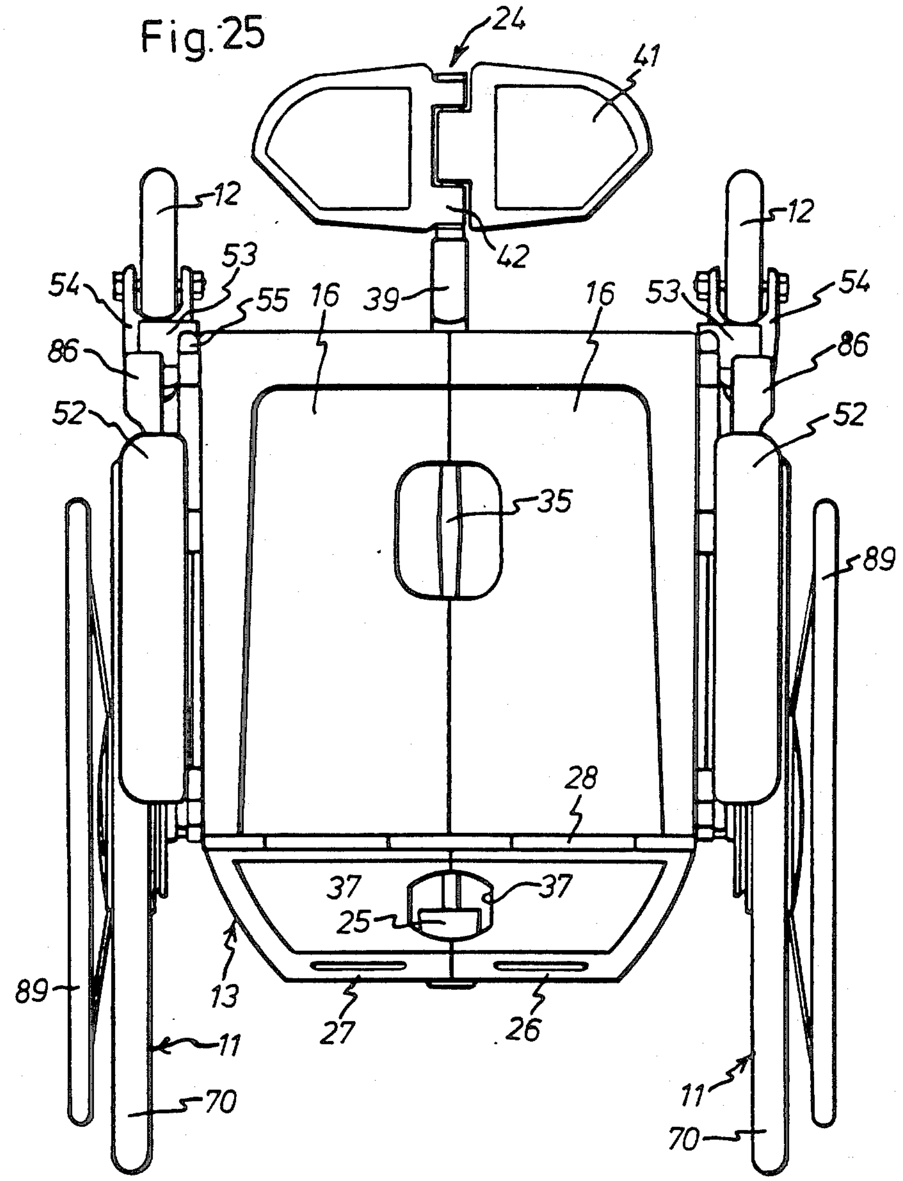
FIG. 25 shows the unfolded chair from above.
Figure 26:
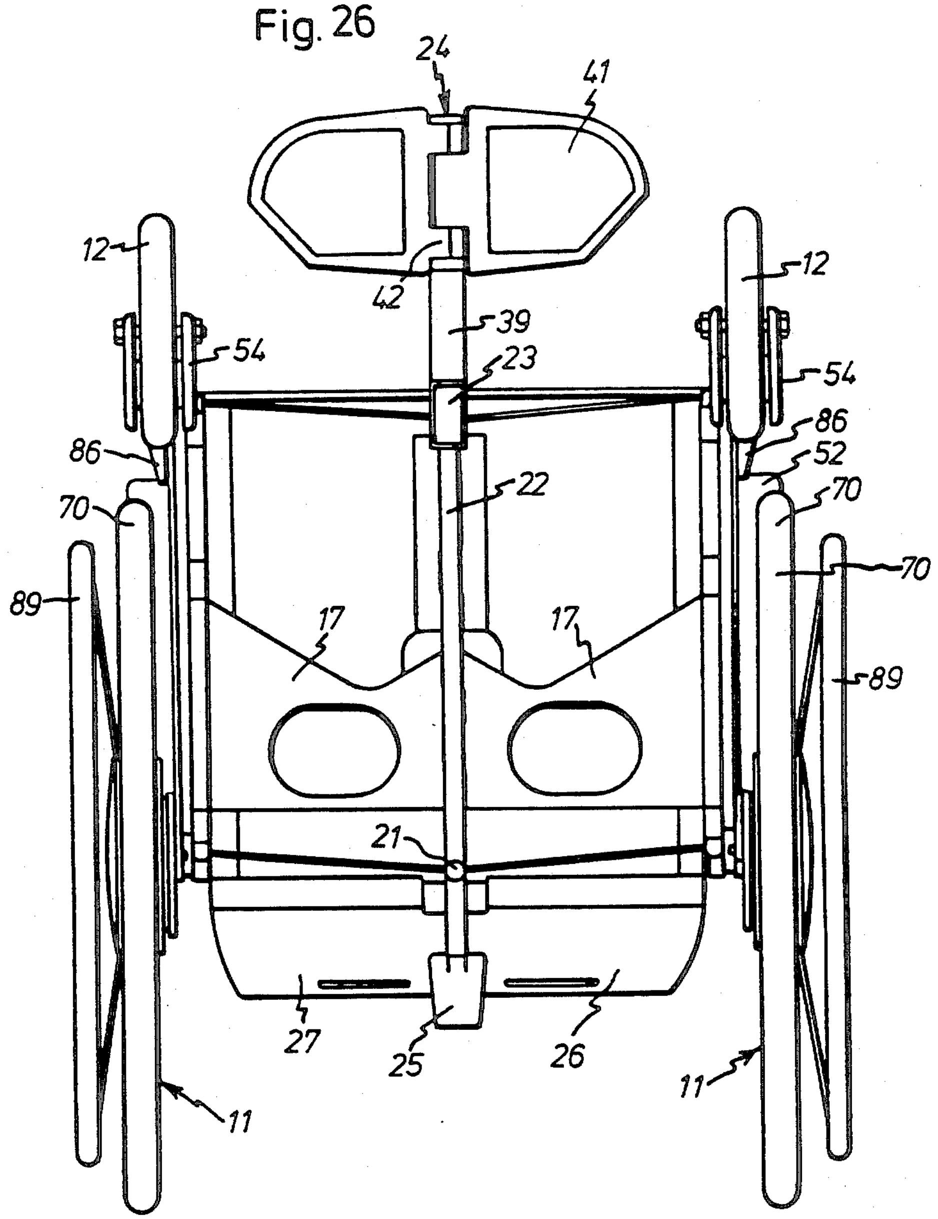
FIG. 26 shows the unfolded wheel-chair from below.

As illustrated in the drawings, the wheel-chair according to the invention has a foldable frame structure 10 which can be locked in the unfolded state and which carries large rear wheels 11 and small front wheels 12, and a back 13. The frame construction is box-shaped and has rigid side walls 14. The side walls are connected to each other by means of a seat consisting of two halves 15 of which FIG. 4 shows only the metal parts provided along the sides and covered by a seat pad 16 which may consist of expanded, moulded polyurethane. FIGS. 21 and 22 show one half of the seat pad 16.

The side walls 14 are also interconnected by means of a bottom consisting of two hingedly interconnected parts 17. The bottom and seat portions 15, 16 are connected to each other by means of a connecting wall 18. The connections between the side walls 14, the seat portions 15 and the bottom portions 17 are achieved by the provision of a hinge pin extending along each longitudinal edge of the box structure 10. Similarly, there are provided longitudinal hinge pins at the connections between the seat 15 and the connecting wall 18, and between the bottom 17 and the connecting wall 18. By the provision of the connecting wall 18, an upward folding movement of the seat 15 will produce a corresponding movement of the bottom 17, such that the side walls will be moved towards each other.

The side walls 14 are connected to each other also by means of folding front and rear walls 19 and 20, respectively. The connections between the side walls and the front wall and the rear wall, respectively, are achieved by means of vertical hinge pins which are disposed at the corners of the frame structure. The two parts of the front wall and the rear wall, respectively, are connected to each other by means of vertical hinge pins 21. These hinge pins are fixed to a rigid member 22 which extends underneath the bottom 17 and has at its front end an attachment 23 for a footrest 24 and at its rear end a plate 25 to permit running the wheel-chair on the rear wheels only, in which case the person pushing the chair exerts a pressure on the plate 25.

Figure 1:
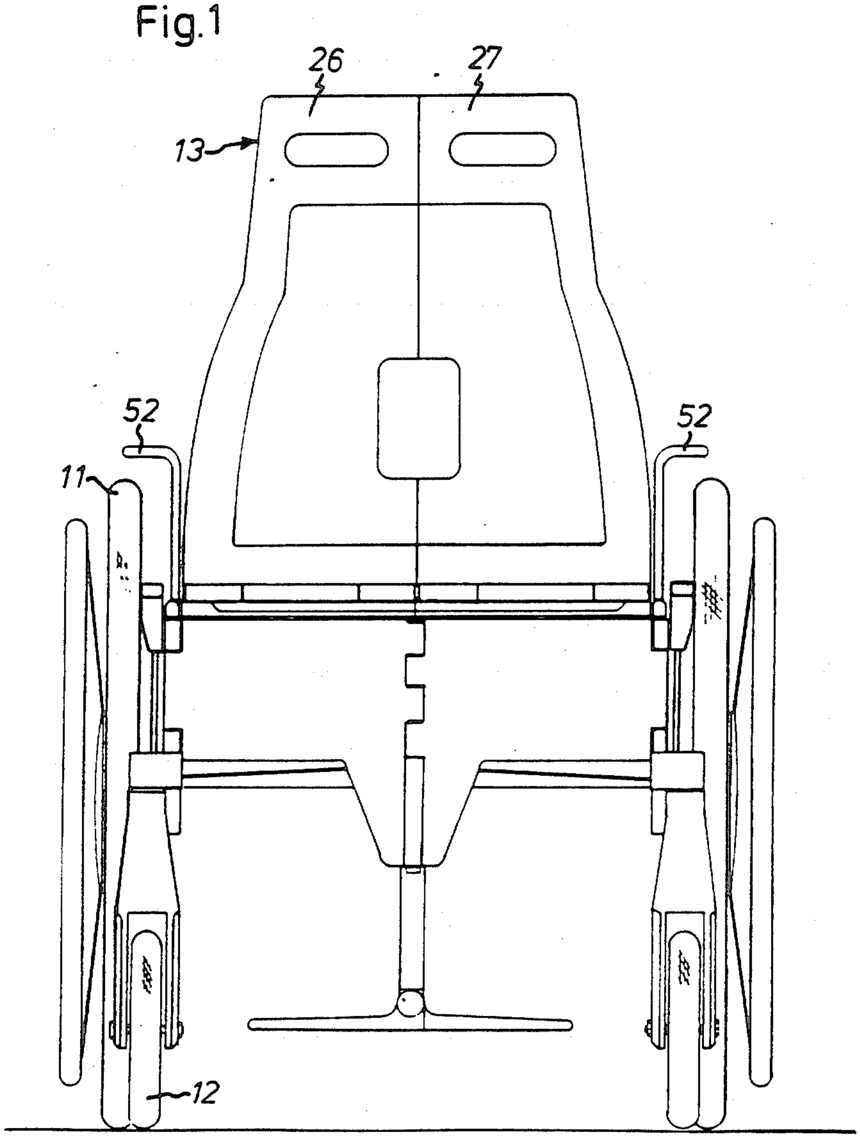
FIG. 1 illustrates one embodiment of a collapsible wheel-chair according to the invention seen from in front and in the unfolded state.
Figure 2:
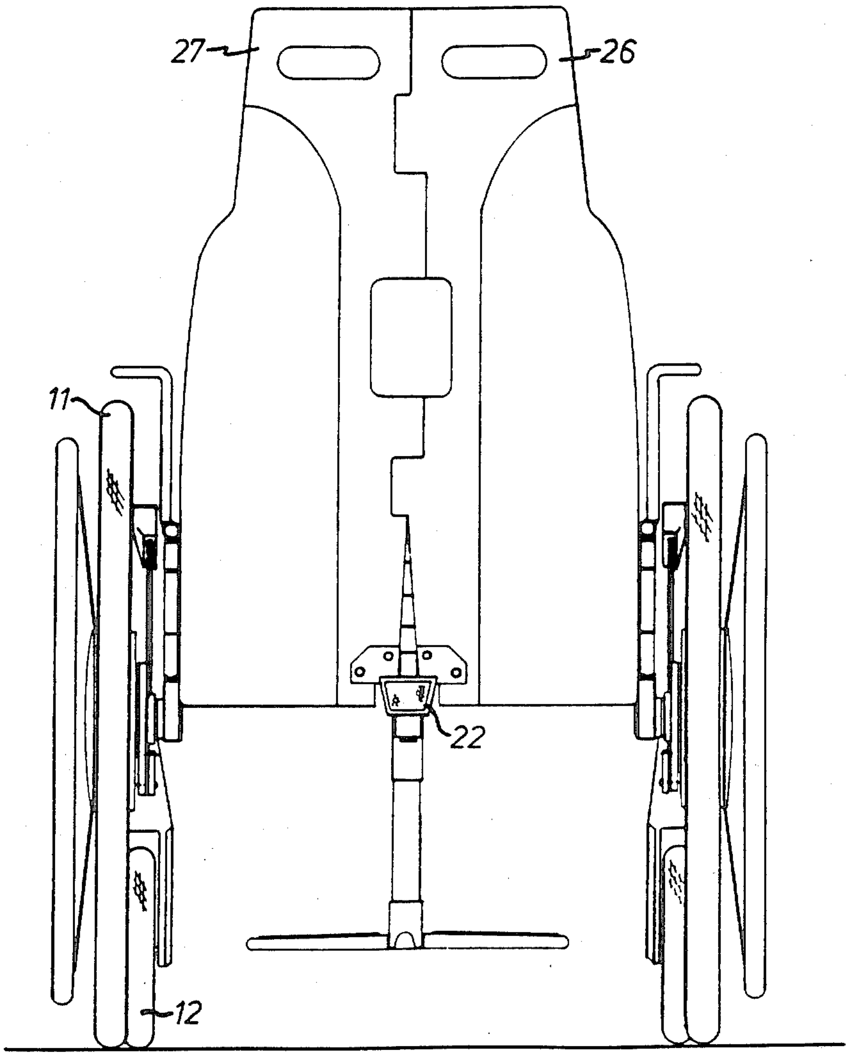
FIG. 2 shows the same wheel-chair from the rear.

The back 13 consists of two parts 26, 27 each of which is hingedly connected to an associated seat member 15. The hinge connection 28 is located at the rear edge of the seat. As appears from FIGS. 2 and 4, the back members 26, 27 extend beyond the hinge pin 28 down to the rigid member 22 so as to engage, when in the raised position, the rearwardly slightly angled rear wall 20 to prevent it from folding rearwards. In order to maintain the back in the raised position, it is possible to provide on the rigid member 22 either a fixed locking device or a movable locking device which prevents lowering of the back.

Figure 5:
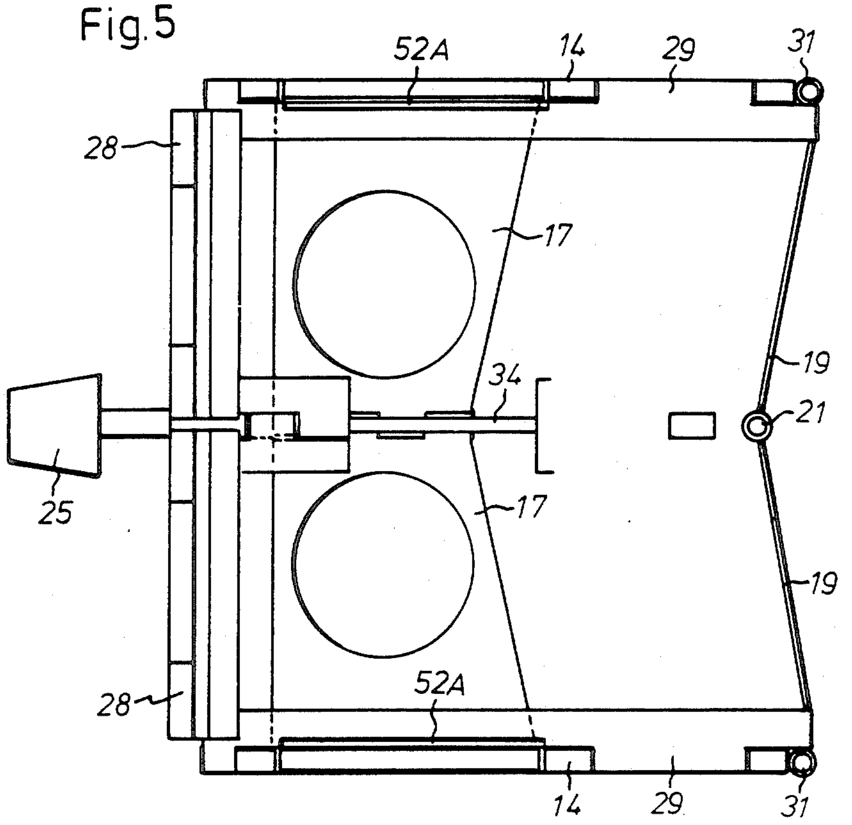
FIG. 5 shows certain parts of the frame structure from above.
Figure 10:
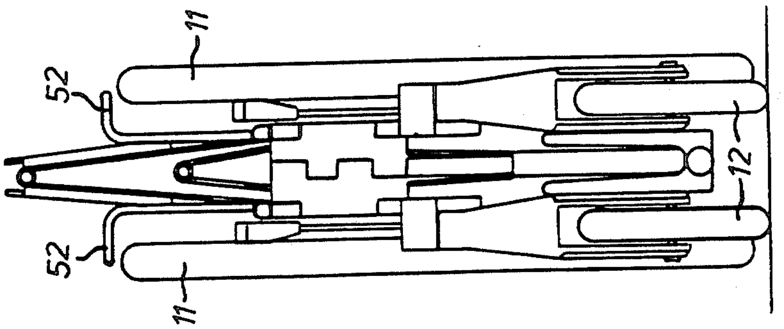
FIG. 10 shows the wheel-chair from in front in the collapsed state.
Figure 9:
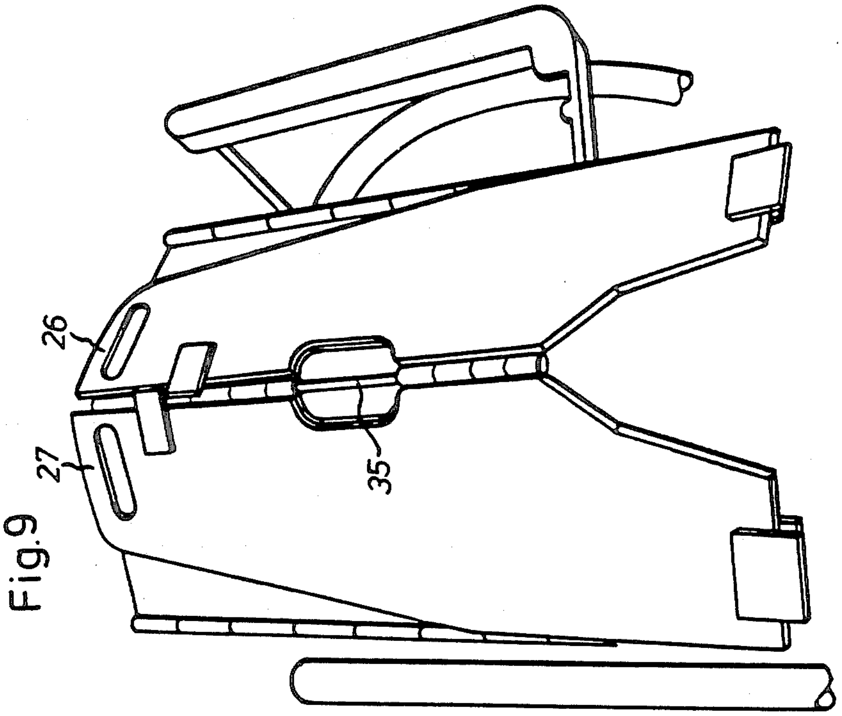
FIG. 9 shows the wheel-chair obliquely from above and from the rear and illustrates the commencement of a folding operation after the back has been lowered.
Figure 11:
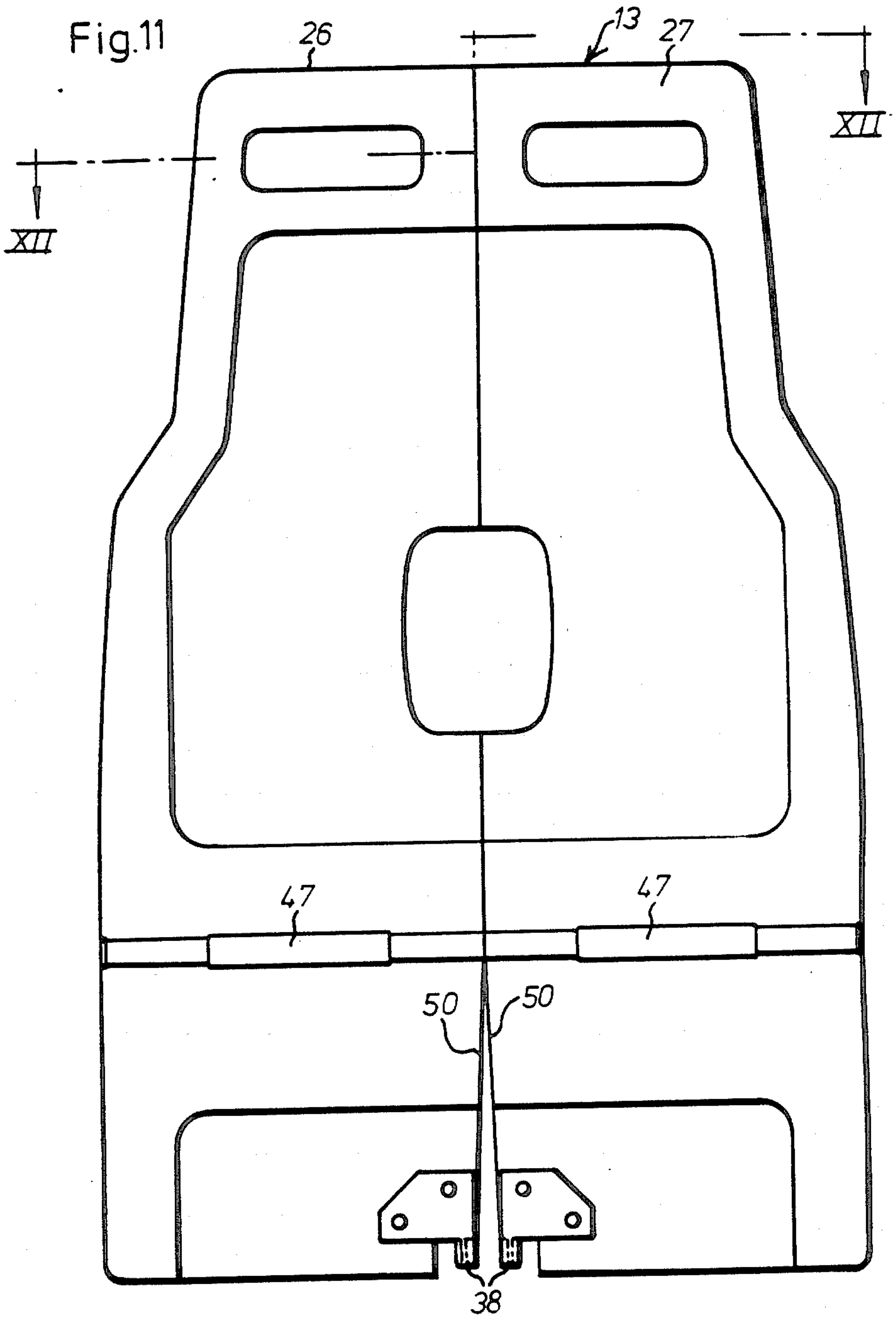
FIG. 11 shows the back from in front in the raised state.
Figure 12:
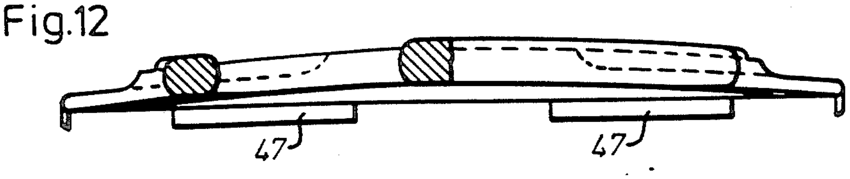
FIG. 12 is a section taken along the line XII—XII in FIG. 11.
Figure 15:
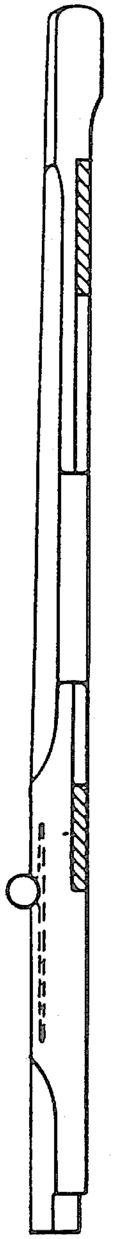
FIG. 15 is a section taken along the line XV—XV in FIG. 13.
Figure 16:
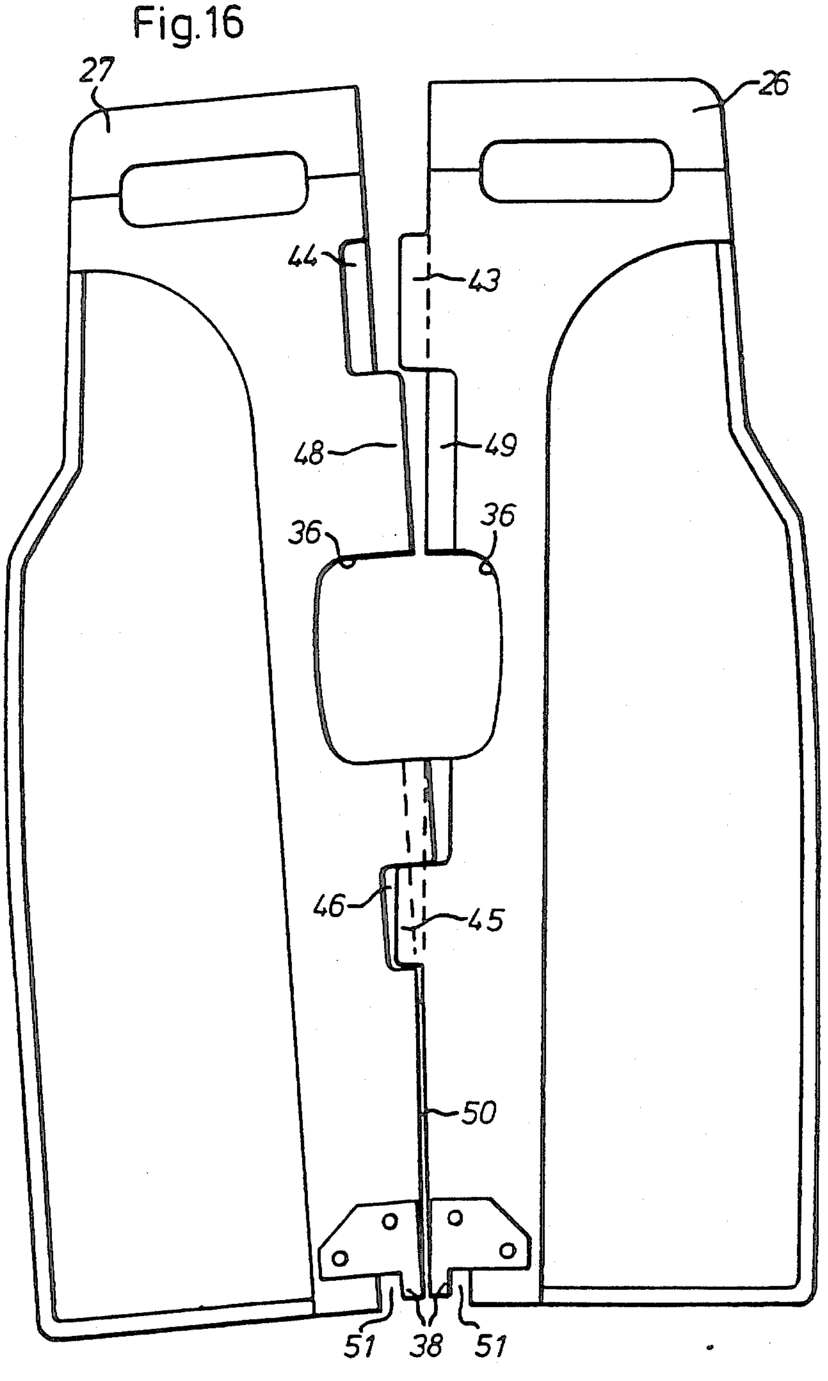
FIG. 16 shows the back from the rear when the back portions have been swung apart during unfolding or folding of the wheel-chair.

As mentioned above, the front and rear walls each consist of two hingedly interconnected parts. These two parts have a larger overall length than the width of the frame structure in the unfolded state thereof. This means that the front and rear walls are angled rearwards, as illustrated in FIGS. 4 and 5, when the frame structure is raised. Since the central hinge pins 21 of the front and rear walls are connected to the rigid member 22, the two walls will jointly be swung rearwards when the wheel-chair is folded up. Since the bottom wall 17 is above the rigid member and, also, is connected to the seat portions 15, 16, the frame structure can be collapsed. The initial phase of the folding operation proceeds in such a manner that the locking device for the back is first loosened either by releasing a movable locking device or by a slight upward pull in the seat, whereby the back portions will be moved apart, as is illustrated in FIG. 16 and described in more detail hereinbelow. When the back portions have been moved apart in this manner, they can be pivoted about their respective hinge pins 28 so as to lie flat against their respective seat portion, as illustrated in FIG. 9, whereupon the continued upward pivotment of the seat and bottom portions can be effected to finally collapse the wheel-chair as illustrated in FIG. 10.

Figure 6:
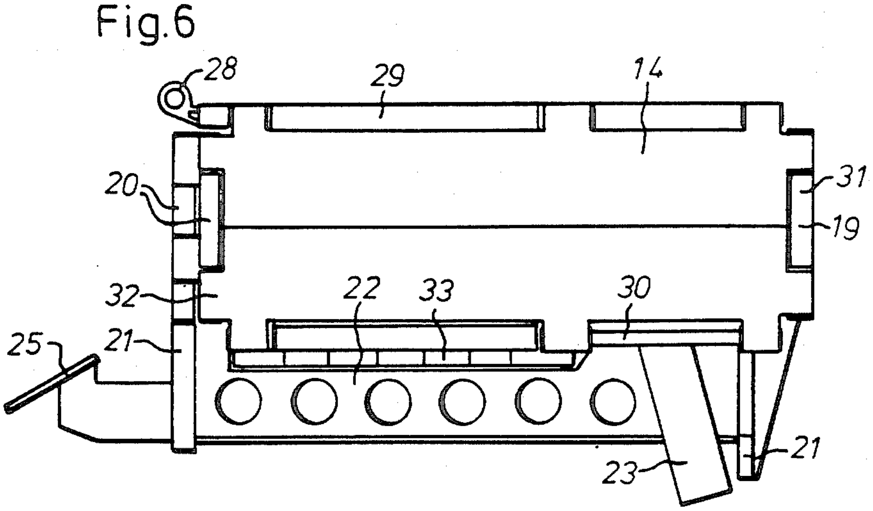
FIG. 6 shows the same parts of the frame structure from the side.

FIGS. 4–6 illustrate all the hinge pin connections required for collapsing the frame structure per se. The vertical hinge pins 21 have already been mentioned in the foregoing. These hinge pins serve as connections between the rigid element 22 and the common hinge lines for the front wall portions 19 and the rear wall portions 20, respectively. Further, mention has also been made above of the hinge pins 28 which connect the back portions 26, 27 to the rear edge of the associated seat portion 15. In addition to these hinge pins, there are provided hinge pins 29 connecting the seat portions 15 to the upper edge of the side walls 14. At the lower edge of the side walls, there is a hinge pin 30 connecting the bottom wall portions to the side walls. At the front edge of the side walls 14, there are vertical hinge pins 31 connecting the side walls to the front wall portions 19. At the rear edge of the side walls 14, there is a further vertical hinge pin 32 connecting the rear wall portions 20 to the side walls 14. At the connection between the bottom portions 17 and the rigid central wall 18, there is a hinge pin 33. At the connection between the seat portions 15 and the rigid central wall 18, there is a hinge pin 34 of which a portion 35 serves as a handle 35 for collapsing the wheel-chair and transporting it when collapsed.

In order to make it possible to grip the handle 35, the seat pad is provided with a recess 36, and the back is provided with a corresponding recess 37. The seat pad 16 may consist of expanded polyurethane and has at its rear edge a recess 38 engaging about a corresponding flange (not shown) at the rear edge of the seat portion 15. The front edge of the seat portion 16 is curved, and the entire seat portion is cup-shaped so as to offer a comfortable surface to sit on.

Figure 7:
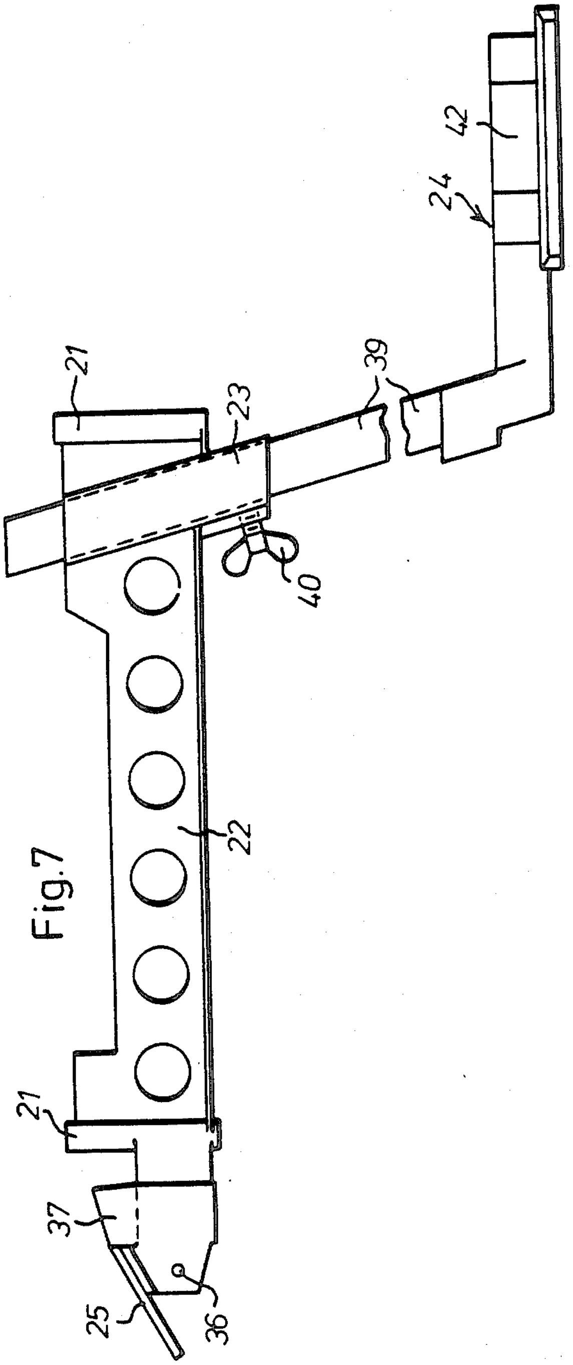
FIG. 7 is a side view of a rigid member included in the frame structure and a footrest fixed thereon.
Figure 8:
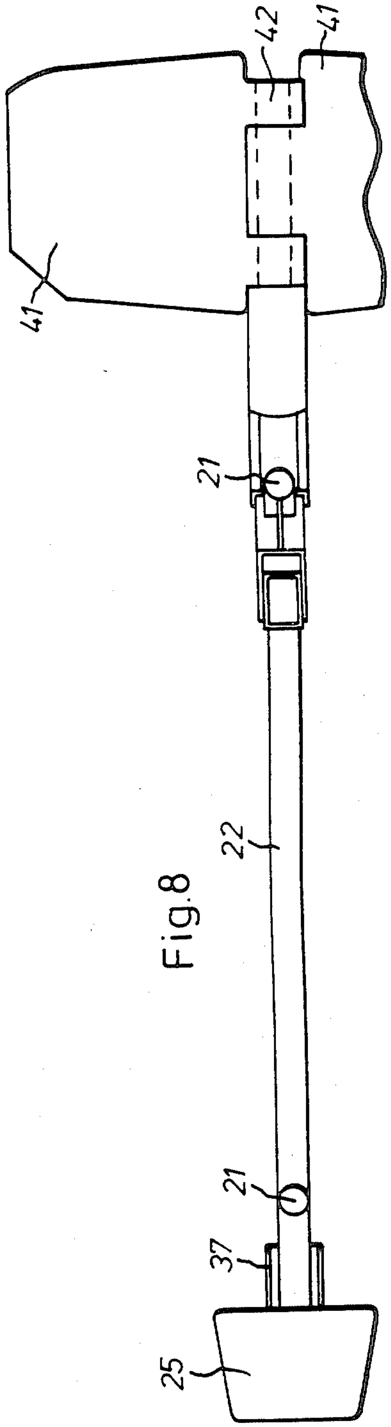
FIG. 8 shows the same member as in FIG. 7 from above.

FIGS. 7–8 illustrate the rigid member 22 with associated parts fixed thereon. In this case, the rear pressure plate 25 serves as a movable locking device which is pivotally mounted on a journal 36 and has its locking member 37 facing upwards so that it can engage the rear edge of the raised back 13 which has locking lugs 38 extending into the space between the locking member 37 and the attachment for the hinge pin 21. When the back is raised, the lugs 38 are thus locked against both rearward and forward movement. At its front end, the member 22 carries the above-mentioned attachment 23 for the footrest 24. The footrest 24 is fixed on an angled rod 39 which can be locked in different vertical positions by extending through the tubular attachment 23. In order to permit adjusting it in different vertical positions, there is a locking screw 40 in the form of a wing nut. The footrest has two foot-supporting plates 41 which are pivotally connected to the angled bar 39 by means of a hinge pin 42 such that the two foot-supporting plates can be raised and folded up between the front wheels when the wheel-chair is collapsed.

The design and function of the two back portions will be described in more detail hereinbelow with reference to FIGS. 11–16. As previously mentioned, the back may consist of moulded, expanded polyurethane and may then have suitable metal inserts, if so required for obtaining sufficient strength. The two back halves 26, 27 are similar but not fully identical. Differences exist at the mutually facing edges of the long sides. As appears especially from FIG. 16, the back half 26 has a projecting flange 43 the thickness of which corresponds to approximately half the thickness of the back. The back half 27 has in a corresponding location a recess 44 which is complementary to the flange 43 and leaves a back wall portion of approximately half the thickness of the back wall. A corresponding flange 45 and recess 46 are provided just above the tubular attachments 47 for the hinge pins 28. In addition, the back half 27 has a flange 48 while the back half 26 has a mating recess 49, this flange and this recess being designed in agreement with the flanges 43, 45 and the recesses 44, 46, respectively.

At the lower end, the back halves are obliquely cut with oblique portions 50 beginning at the attachments 47 for the hinge pins 28. By the provision of these oblique portions 50, the two back halves can be angularly moved with respect to each other while being in the same plane. This appears from FIGS. 16. By such angular movement, the engagement between the flange 48 and the recess 49 will be suspended. This also applies to the engagement between the flange 43 and the recess 44. In that these two flanges and recesses are disengaged with respect to each other, the back portions can be lowered against the seat 15, 16. Since the flanges 43, 48 and 45 are provided on opposite back halves, these halves cannot move relative to each other at right angles to their common plane when an engagement exists between the different recesses and flanges.

Figure 13:
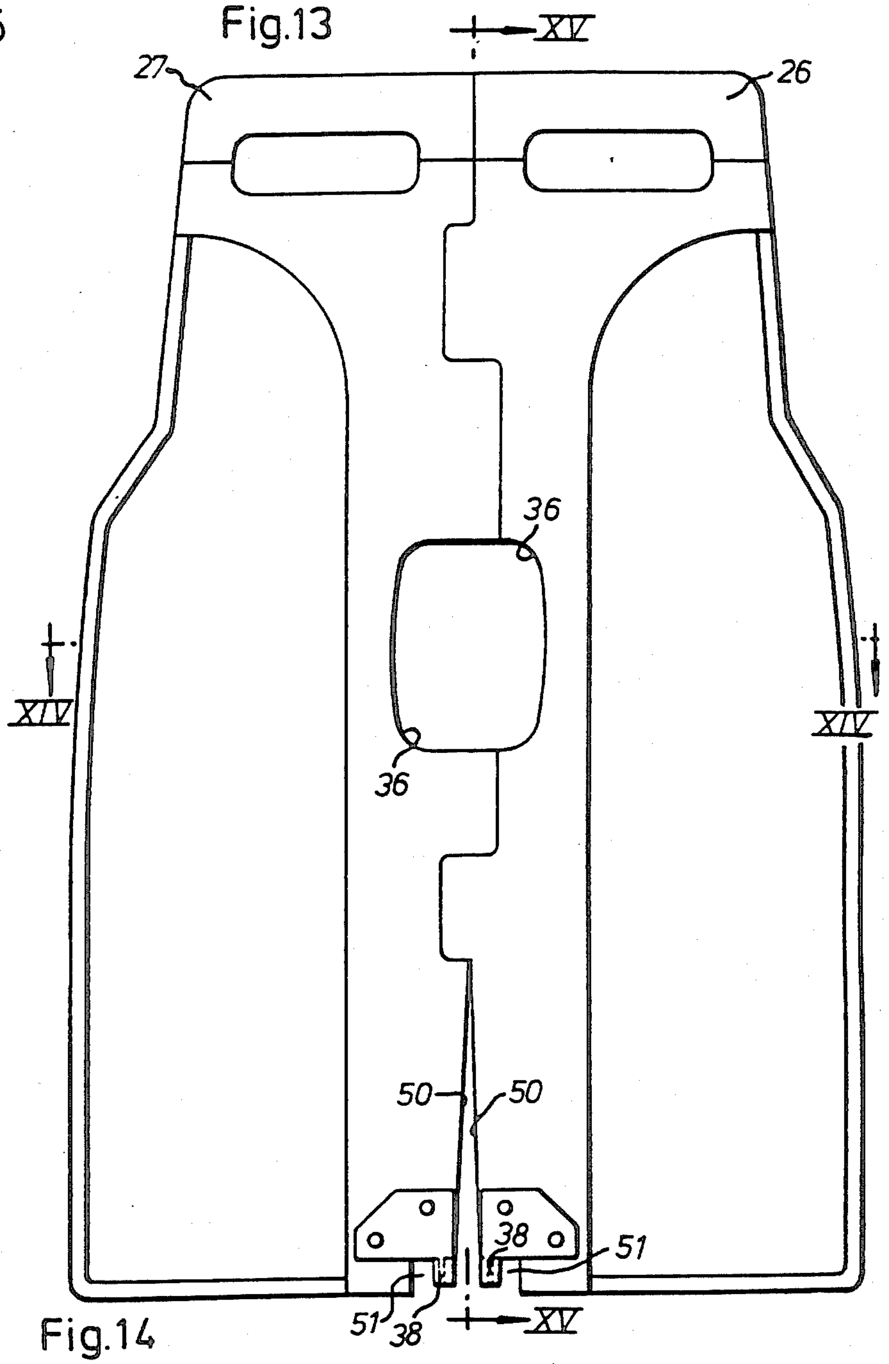
FIG. 13 shows the back from the rear in the raised state.
Figure 14:
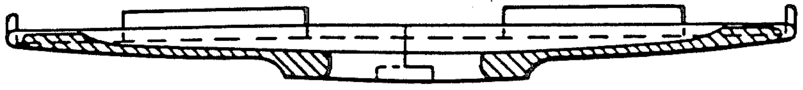
FIG. 14 is a section taken along the line XIV—XIV

If the locking engagement between the back and the locking device on the rigid member 22 is brought about without the use of a movable locking device, the angular movement of the two back halves can be used for releasing the locking engagement. A comparison of FIGS. 13 and 16 shows that the two locking lugs 38 move towards each other when the back portions are moved away from each other. By providing a recess 51 outwardly of each lug 38 and designing the locking member 37 as two separate upwardly projecting metal pieces which are spaced a suitable distance from each other, the recesses 51 can be moved to a position opposite the metal pieces so that the back portions can be lowered when in the position illustrated in FIG. 16. When the back is lowered and the wheel-chair collapsed, the back will be located between the seat and the wheels. If, as shown in this embodiment, the wheel-chair has elbow-rests 52, the back portions 26, 27 will be located between the seat portions 15, 16 and the elbow-rests 52 when the wheel-chair is collapsed. The elbow-rests 52 may be designed as loose members which are inserted in recesses 53 in the seat portions 15, 16 adjacent the hinge pins 29 (see FIG. 5).

Figure 3:
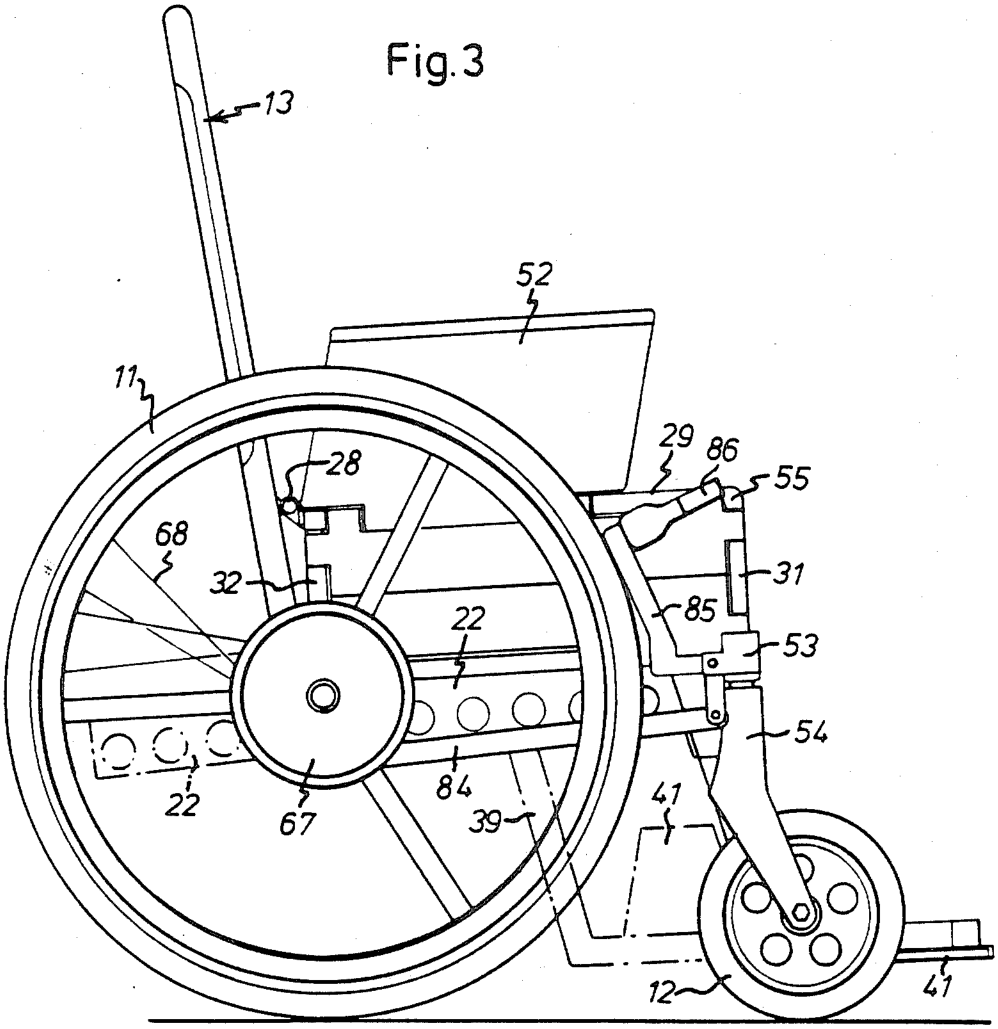
FIG. 3 shows the wheel-chair from the side.

As previously mentioned, the hinge pins at the edges of the side walls 14 are interconnected by means of corner pieces. In FIG. 3, there is shown a corner piece 53 which also serves as an attachment for a pivot shaft for the front wheels 12 which are in the form of castors and, hence, are pivotally connected to the corner piece 53 by means of a fork 54. Also, there is shown a corner piece 55 serving as a connection between the hinge pins 29 and 31. The other two corners are designed similarly.

Figure 18:
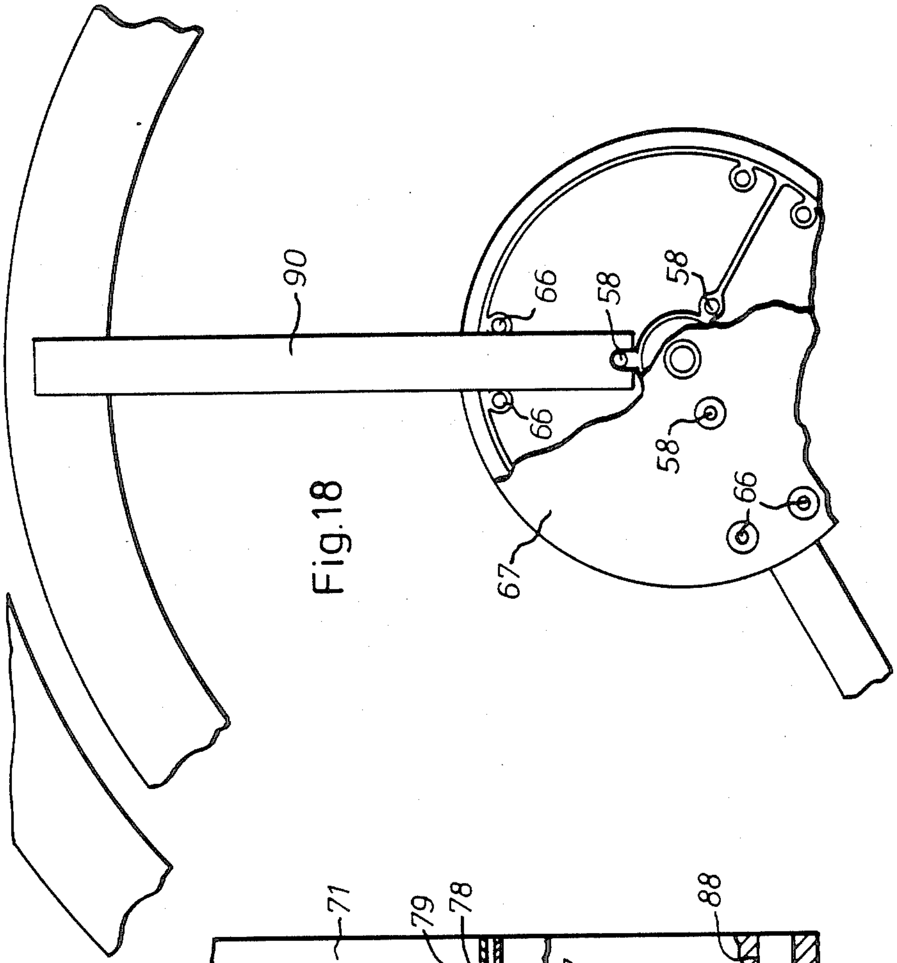
FIG. 18 shows parts of the wheel in a part sectional side view.
Figure 17:
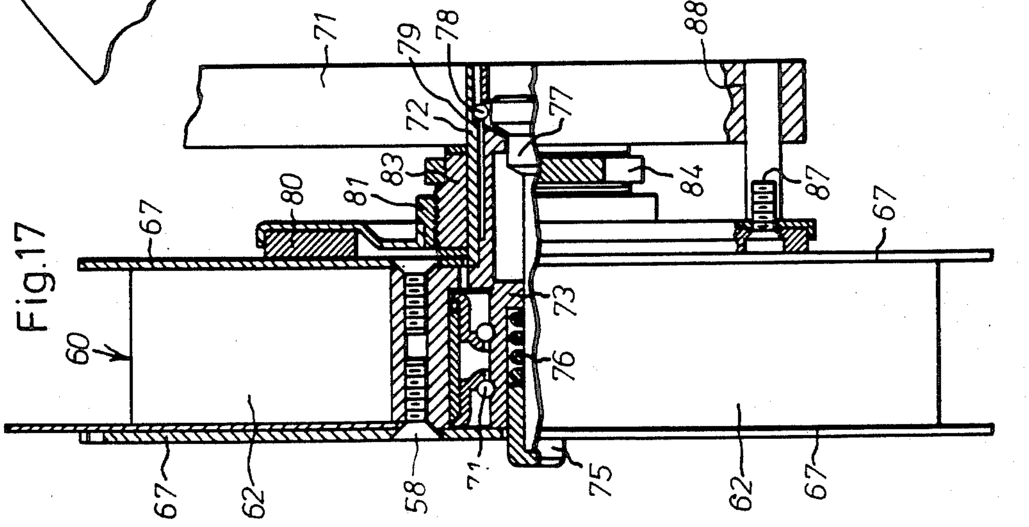
FIG. 17 shows parts of the large wheels of the wheel-chair partly in axial section.
Figure 19:
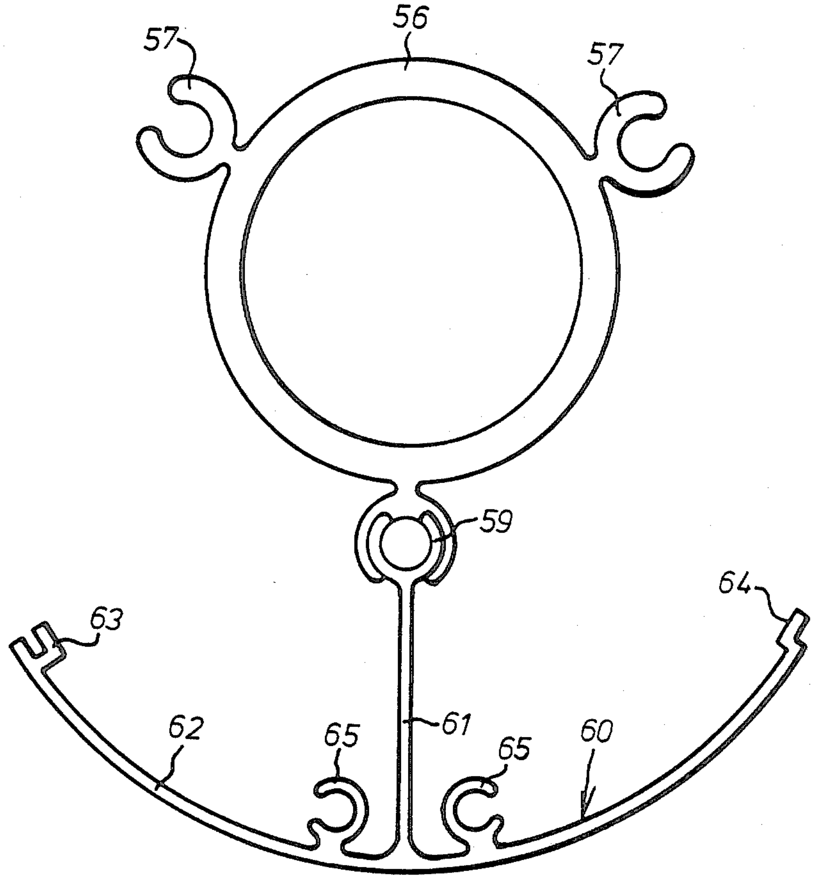
FIG. 19 shows two components included in the hub of the wheel.

FIGS. 17–19 show the construction of the large wheels 11 of the wheel-chair. The wheel 11 has a hub made up of a number of components. The hub thus has a central portion 56 with three projecting ears 57. These ears are arranged for receiving screws 58 which at the same time engages with ears 59 on an outer hub member 60. By means of a spoke portion 61, the ears 59 are connected to an arcuate part 62 having at its ends groove and tongue members 63 and 64, respectively. By means of these groove and tongue members 63, 64, the member 60 can cooperate with two further, similarly designed members, such that a complete outer hub portion is obtained. The inner side of the member 60 is provided with two ears 65 serving as attachments for screws 66. An end cover 67 can be secured on either side of the hub by the screws 58, 66.

The end covers 67 serve as inner attachments for spokes 68 which are secured in a per se known manner to a rim 69 for a pneumatic tyre 70.

In FIG. 17, there is shown a corner piece 71 forming the lower rear corner attachment for the connection between the vertical hinge pin 32 and the horizontal hinge pin 30 of the frame structure. This corner piece serves at the same time as an attachment for a tubular shaft 72. Into this tubular shaft extends a likewise tubular shaft 73 which at its outer end carries a ball bearing 74 by means of which the hub is rotatably mounted on the shaft 73. To permit loosening the wheel 11, there is a locking device comprising a press-button 75 which is outwardly biased by a spring 76. When the button 75 is pressed, a recessed portion 77 on the button is moved inwardly to a position in front of locking balls 78, whereby these will be free to move radially inwardly and, thus, come clear of a shoulder 79 on the inner side of the tubular shaft 72.

In order to permit braking the wheel-chair, there is a disc brake consisting of an annular brake disc 80 which is fixed on a nut 81 engaging with a threaded tubular screw 83 which is rotatably mounted on the outer side of the shaft 72. The tubular screw is rigidly connected to a brake rod 84 which at its front end is pivotally connected to a two-arm lever 85 having a brake handle 86 and being pivotally mounted on the front lower corner piece 53. When pulling the brake handle 86, the brake rod 84 will be moved backwards, whereby the screw 83 will be rotated and the nut 81 displaced outwardly, such that the brake disc 80 is moved into braking engagement with the inner of the two hub covers 67. The brake disc 80 and the nut 81 are prevented from rotating relative to the frame structure since the brake disc has a locking pin 87 engaging in a corresponding hole 88 in the corner piece 71.

Figure 20:
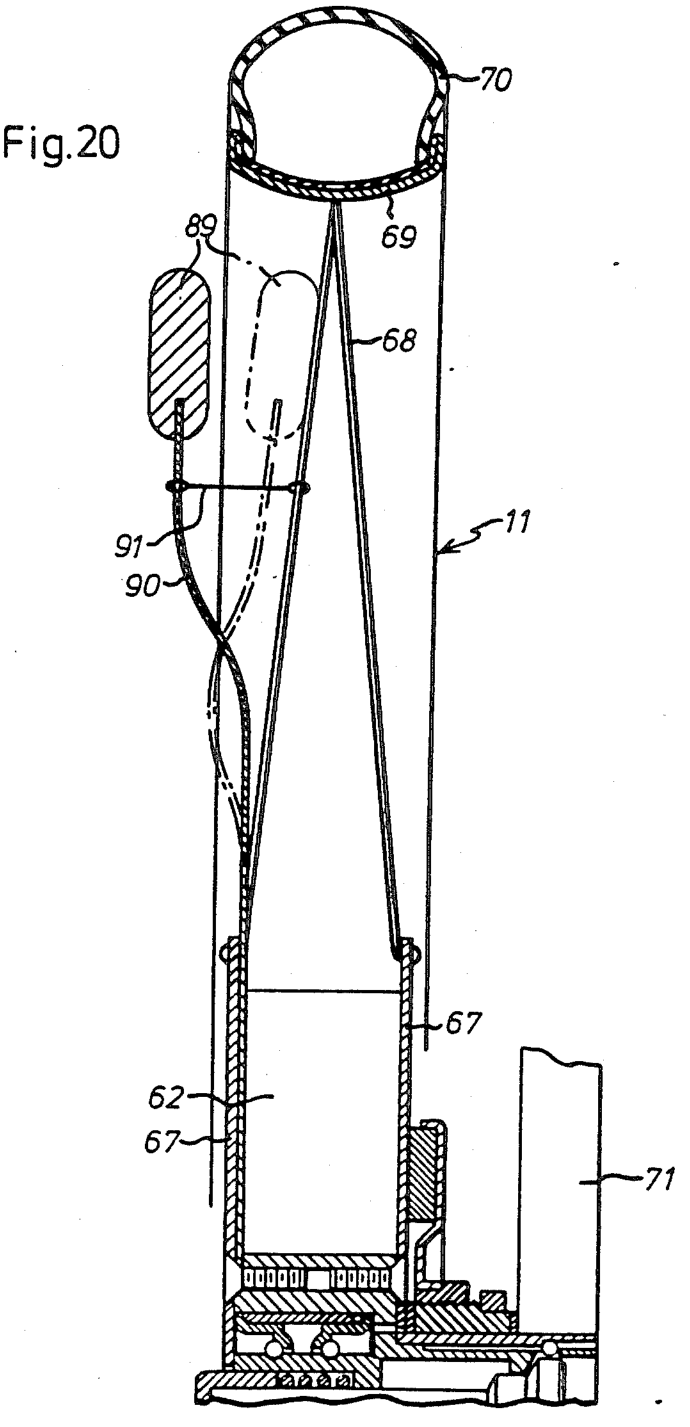
FIG. 20 is a schematic section corresponding to FIG. 17 and illustrates the two stable positions of the driving ring.

As earlier mentioned and as appears from FIGS. 18 and 20, the large wheel has a driving ring 89. This driving ring can be moved outwards to the position shown in full lines in FIG. 20 and inwardly to the position shown in broken lines in FIG. 20. This inward and outward movement of the ring can be performed with the aid of three leaf springs which are fixed between the driving ring 89 and the hub. The leaf springs are fastened in the hub by being inserted through recesses in the arcuate part 62 between the two ears 65. The springs will thus be held in place by means of the three screws 58 and 66 and the spoke-forming part 61 holding the springs pressed against the inner side of the cover 67. Outside the hub, the springs extend in a gentle S-shape out to the driving ring 89 in which they are fixed in a suitable manner. Between the springs or the driving ring and the spokes 68, there is a string 91 which restricts the distance by which the springs can move outwardly when the driving ring is moved to its outer position. The springs 90 have a length exceeding the distance between the driving ring 89 and the hub. When moved from the outer position to the inner position, the springs 90 will pass a position of maximum tension where the fixing points of the springs at the hub and the driving ring are opposite each other. As appears from FIG. 20, the inner position is located inwardly of the position of maximum tension, while the outer position is outwardly of the position of maximum tension. By the provision of the strings 91, the springs 90 will always be maintained tensioned, also in the outer position. This imparts stability to the driving ring, such that it will not tend to "wobble" when in the outer position.

As will have been appreciated from the above, the hubs of the large wheels may consist of extruded pieces of material which have been cut to suitable lengths and in which grooves for springs can be milled. In the mounting operation, the end walls 67 are mounted to form flanges for attachments for the spokes 68. The springs 90 preferably are relatively wide and should have a certain distance of anchorage to provide the required stability. The springs serve as an overcenter mechanism by being constantly maintained tensioned in the two extreme positions. In the inner position, the springs are prevented from becoming completely untensioned in that the driving ring is pressed against the spokes. In the outer position, complete relaxation of the springs is prevented by the provision of the strings 91.

By the above-mentioned special design of the hub, it will be very rigid. The end walls 67, together with the intermediate parts 60, 56, serve as a box girder giving the box substantial rigidity in the transverse direction, whereby lateral movement is prevented if an obliquely directed load on the wheels should occur.

Since the hub diameter of the wheel is large, there is obtained a sufficient angle between the spokes and the rim in order to achieve considerable stability. Also, since the hub has a large diameter, it has been possible to give the disc brake a large diameter and, thus, a high braking effect. The design of the hub is also advantageous in that the hub can be made of but a few components which are simply screwed together by means of a number of screws.

As appears from the above and as readily realized by the skilled reader, the wheel-chair according to the invention offers many advantages. Since the footrest 41 can be folded upwards, it will be easier for the person using the chair to sit down and get up from the wheel-chair. The folding construction also makes it possible to place the footrest between the large rear wheels when collapsing the wheel-chair. This appears from FIG. 3 where the footrest 41 and the rigid member 42 are illustrated by broken lines in their retracted position in the collapsed state of the wheel-chair. As also appears from FIG. 3, the overall length of the wheel-chair is reduced when collapsing the wheel-chair. The overall length can be reduced by pivoting the front wheels 12 half a revolution. As appears from FIG. 7, the footrest is vertically adjustable and it may also be angularly adjustable by providing a hinge connection between the downwardly directed and horizontal parts of the angled rod 39.

Since the different corners of the frame structure have been designed as corner pieces into which the different hinge pins extend, a rigid construction is obtained. Moreover, the different parts will be easy to mount. Further, the pivotal movement can be facilitated by providing the sleeves of the different wall portions with plastic bushings through which the hinge pins extend. In this manner, it is possible to prevent direct contact between the hinge pins and the parts made of metal.

In that the elbow-rests 52 have been designed as obliquely cut pieces of material (see FIG. 3) and, moreover, have been inserted in the recesses 53, it is possible to reverse the elbow-rests to make them project rearwardly or forwardly if a different position of the elbow-rests is desirable.

The seat portions 15, 16 rest on the upper edge of the front and rear wall members 19, 20, this imparting great stability to the seat. A downwardly directed pressure on the seat also entails that the two back halves 26, 27 are positively held together, such that the engagement between the different flanges and recesses is maintained. Since the back is also locked in its raised position, great stability is obtained and unintentional lowering of the back will be impossible. Thus, it is possible to run the wheel-chair by seizing the back and using it as a handle for manoeuvring the wheel-chair.

The embodiment of the wheel-chair described above is merely given as an example. Many modifications are possible within the scope of the invention. Thus, the different parts can be designed otherwise and be provided with e.g. weight-reducing recesses to further reduce the weight of the wheel-chair. The material of the load-bearing parts of the wheel-chair may be e.g. aluminium alloys or magnesium alloys or other light alloys having the required strength. As back and seat materials, use can be made of plastics or materials other than the expanded polyurethane suggested above.

We claim:

1. A collapsible wheel-chair having a foldable frame structure (10) which can be locked in the unfolded state and which supports the wheels (11, 12) and the back (13) of the wheel-chair and which comprises a box-shaped seat having side wall members (14) connected to foldable seat and bottom members (15, 16; 17) and to foldable front and rear wall members (19; 20), characterized in that the seat and bottom members (15, 16; 17) are foldable upwards and each consist each of two rigid, hingedly interconnected seat and bottom portions, respectively, (15, 16; 17) and are mechanically interconnected for common folding movements, that the front and rear wall members (19; 20) are foldable rearwards and each consist of two rigid, hingedly interconnected front and rear wall portions, respectively, (19; 20) and are mechanically interconnected by means of a rigid member (22) extending underneath the bottom portion (17), and that the back (13) can be raised and consists of two back portions (26, 27) which are pivotally connected to the rear edge of a respective part (15) of the foldable seat member (15, 16) and which in the unfolded state of the wheel-chair extend downwards behind the rear wall member (20) for releasably engaging a locking device (37) provided on the frame structure.

2. Wheel-chair as claimed in claim 1, characterized in that the wheels (11, 12) of the wheel-chair are connected to corner pieces (53, 71) which are each disposed at the corner of a respective side wall member (14) and connected to hinge pins (30, 31, 32) for the rear wall, front wall and bottom portions (20, 19, 17).

3. Wheel-chair as claimed in claim 1 characterized in that the front and rear wall members (19, 20) have a length exceeding the width of the frame structure in the unfolded state and that the two front wall portions (19) and also the two rear wall portions (20) in the unfolded state of the frame structure are directed obliquely rearwardly and make an obtuse angle with each other.

4. Wheel-chair as claimed in claim 1, characterized in that the two back portions (26, 27) of the back (13) are adapted to abut on the rear wall (20) with their parts extending downwardly behind the rear wall member and prevent folding of the rear wall when the back is in its raised position.

5. Wheel-chair as claimed in claim 1, characterized in that those parts of the two back portions (26, 27) which are located below the pivotal connection (28, 47) of the back portions with the rear edge of the corresponding seat member (15) are obliquely cut (at 50) in a downward direction away from each other in order, during the inital phase of an upward folding movement of the seat and bottom members (15, 16; 17), to make it possible, in the plane of the back, to move apart the parts of the back portions located above said pivotal connection (28, 47), and that the mutually facing edges of the two back portions above said pivotal connection have engagement means (43-46, 48, 49) which in the fully unfolded state of the frame structure engage with each other in order to prevent any relative movement of the back portions (26, 27) at right angles to the planes thereof.

6. Wheel-chair as claimed in claim 5, characterized in that the engagement means (43-46, 48, 49) consist of complementary flanges (43, 45, 48) and recesses (44, 46, 49) in the mutually facing edge portions of the two back portions (26, 27).

7. Wheel-chair as claimed in claim 1, characterized in that the locking device (37) for the back (13) is provided on a rearwardly extending part of the rigid member (22) disposed underneath the bottom member (17).

8. Wheel-chair as claimed in claim 7, characterized in that the locking device (37) is fixedly mounted on the rigid member (22) and that each back portion (26, 27) has a locking projection (38) which in the fully unfolded state of the frame structure is in locking engagement with the locking device (37) and prevents lowering of the back and which, when the parts of the back portions (26, 27) located above the seat member are moved apart in the plane of the back, is moved out of said locking engagement to permit folding the back.

9. Wheel-chair as claimed in claim 1, characterized in that the two seat portions (15, 16) of the seat member are hingedly interconnected by means of a hinge shaft (34) extending through a central recess (36) on the seat member (15, 16) to serve as a handle (35) for lifting the wheel-chair for folding and transporting it.

10. Wheel-chair as claimed in claim 1, characterized in that the rigid member (22) provided underneath the bottom portion (17) has an attachment (23) for or is connected to a footrest (24, 41, 42).

11. Wheel-chair as claimed in claim 1, characterized in that the wheel-chair has two large wheels (11) and at least one small wheel (12), the small wheel or wheels (12) being designed in a per se known manner as castors and the large wheels (11) being disposed at such a distance from the frame structure (10) that there is sufficient space for the back portions (26, 27) between them and the frame structure when the wheel-chair is in the folded state.

12. Wheel-chair as claimed in claim 11, characterized in that each of the large wheels (11) of the wheel-chair has a driving ring (89) which can be moved between an inner and an outer position.

13. Wheel-chair as claimed in claim 12, characterized in that the driving ring (89) of each wheel (11) is connected to the hub (60) of the wheel by means of at least three leaf springs (90) which are provided substantially in the plane of the wheel and which in their untensioned state have a length which is greater than the difference between the diameter of the hub and the diameter of the driving ring and which are maintained constantly tensioned in a gently S-shaped state by means of a flexible connection (91) between the wheel (11) and the driving ring (89) and which have such a length and such an S-shape that when the driving ring (89) is pressed inwards towards the wheel (11), they pass an unstable position of maximum tension and thereafter urge the driving ring (89) against the wheel (11).

14. Wheel-chair as claimed in claim 1 characterized in that it has a brake disc (80) which is connected to the frame structure (10) and which, by means of a brake handle (86), can be brought into engagement with the side face of the associated wheel hub (60) for braking the wheel (11).

15. Wheel-chair as claimed in claim 14, characterized in that the brake disc (80) is connected to a nut (81) which in turn is connected to the brake handle (86) and is in threaded engagement with a threaded journal (83) fixed on the frame structure (10).

* * * * *